Figure 1:
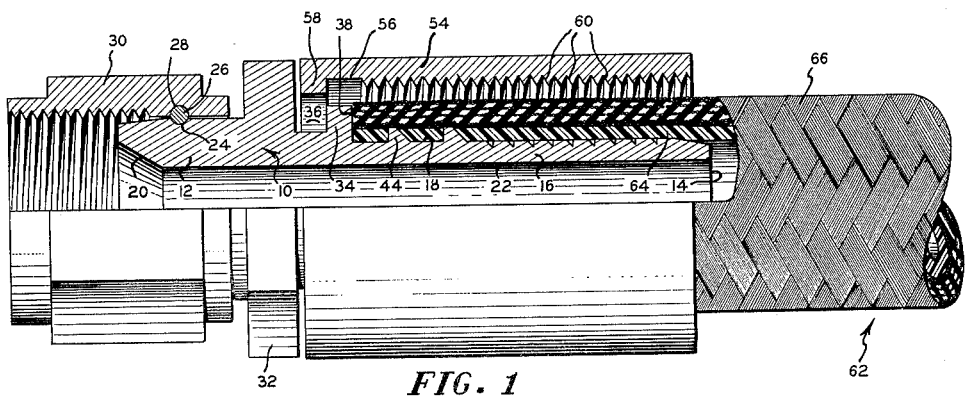

Dec. 21, 1965  C. F. CRISSY  3,224,794
HIGH PRESSURE HOSE FITTING
Filed Oct. 10, 1962  2 Sheets-Sheet 1

INVENTOR.
Charles F. Crissy
BY Jerry K. Harness

Dec. 21, 1965  C. F. CRISSY  3,224,794
HIGH PRESSURE HOSE FITTING
Filed Oct. 10, 1962  2 Sheets-Sheet 2

INVENTOR.
Charles F. Crissy
BY
Jerry K. Harmon

United States Patent Office 3,224,794
Patented Dec. 21, 1965

3,224,794
HIGH PRESSURE HOSE FITTING
Charles F. Crissy, Jackson, Mich., assignor to Aeroquip Corporation, Jackson, Mich.
Filed Oct. 10, 1962, Ser. No. 229,554
1 Claim. (Cl. 285—40)

The invention pertains to an end fitting for flexible hose, and particularly pertains to an end fitting for use with hose internally subjected to very high pressures.

Conventional hose end fittings, of both the permanent and reusable type, often employ a nipple member which is inserted into the bore of the hose and a socket member which encompasses the hose in radial opposition to the nipple. The attachment of the fitting to the hose is accomplished by the frictional engagement of the hose upon the nipple and the engagement of the socket upon the outer surface of the hose. The socket is usually mechanically connected to the outer end of the nipple member whereby movement of the fitting is a "blow-off" direction is effectively resisted by the frictional engagement of the socket upon the hose, as well as that between the nipple and hose. To increase the gripping action of the socket and nipple relative to the hose, it is common to employ serrations, teeth, or recesses upon the surface of the socket or nipple engaging the hose. Such conventional constructions have proven satisfactory for use with flexible hose transmitting fluid mediums under normal pressures. However, if the fluid medium is under extremely high pressure, considerable difficulty has been encountered in reliably maintaining the end fitting upon the hose, and for this reason the use of flexible hose in high pressure applications has not been considered advisable and is generally avoided, if possible.

It is the basic object of the invention to provide an end fitting for flexible hose which is capable of being firmly and reliably affixed to very high-pressure hose having a reinforcing cover, and wherein the retention between the fitting and hose is of such a degree that rupture of the hose will take place before the connection between the fitting and hose fails. Very high-pressure, flexible hose usually includes a resilient inner tube nonpermeable to the medium being transmitted by the hose. To prevent radial expansion and failure of the inner tube, the inner tube is encased within a reinforcing covering of such nature to permit the hose to maintain flexibility, yet prevents significant radial expansion of the inner tube due to the pressure of the medium. In the very high-pressure hose constructions, to which the invention is most applicable, the inner tube reinforcing cover consists of a plurality of superimposed layers of wire strands. Adjacent layers of the wire strands are usually wound spirally in opposite directions, and the exterior layer of wire is often in the form of a braided cover. A filler material, often of a synthetic nature, is usually interposed between the adjacent layers of wire strands to insure the desired layer construction and to prevent excessive movement between the adjacent layers of reinforcing wire.

Conventional hose end fittings which have been employed with flexible hose having an inner tube and an exterior reinforcing cover, rely upon the nipple to engage the inner tube and the socket to engage the reinforcing cover. A disadvantage of this construction results from the fact that the radial compressive forces imposed upon the reinforcing covering by the socket are partially absorbed by the resiliency of the inner tube which is compressed upon the nipple by the socket pressures. Also, such compressive forces usually adversely affect the sealing connection between the inner tube and nipple. Thus, it is most difficult to obtain the degree of compression upon the reinforcing covering which is necessary to provide a satisfactory high-pressure hose end fitting, and maintain the other required functions of the fitting.

In accord with the invention, the above-mentioned disadvantage of conventional constructions is overcome by the provision of means upon the nipple which pierce, and extend through, the hose inner tube and engage the innermost portions of the reinforcing cover. This construction permits very high compressive forces to be produced on the reinforcing cover interposed between the inner tube piercing means and the fitting socket. Also, the inner tube piercing means directly connects the inner portion of the reinforcing cover to the nipple. Thus, by gripping the strongest part of the hose, i.e., the reinforcing cover, with both the nipple and the socket, a much higher resistance to "blow-off" pressures is obtained than with heretofore known hose end fittings.

It is, therefore, an object of the invention to provide a hose end fitting for use with flexible hose having an inner tube and a reinforcing covering wherein a fitting nipple received within the interior of the inner tube directly engages portions of the reinforcing covering and permits direct compression of the reinforcing covering between the nipple and a socket member.

A further object of the invention is to provide a hose end fitting for use with very high-pressure hose applications which employ an internal inner tube received nipple, and an external reinforcing cover engaging socket, wherein a very high degree of compression of the hose reinforcing cover is obtainable without affecting the sealing connection between the nipple and hose inner tube, and without producing excessive compression in the sealing area.

A further object of the invention is to provide a hose end fitting for use with high-pressure hose having an inner tube and an external reinforcing covering wherein the fitting may be readily attached to the hose and no skiving of the tube, or covering, is necessary in preparing the hose to receive the fitting.

Yet another object of the invention is to provide a hose end fitting for use with very high-pressure hose applications wherein the concept of the invention may be employed with either permanently swaged socket end fittings or with fittings of the reusable type.

Figure 6:
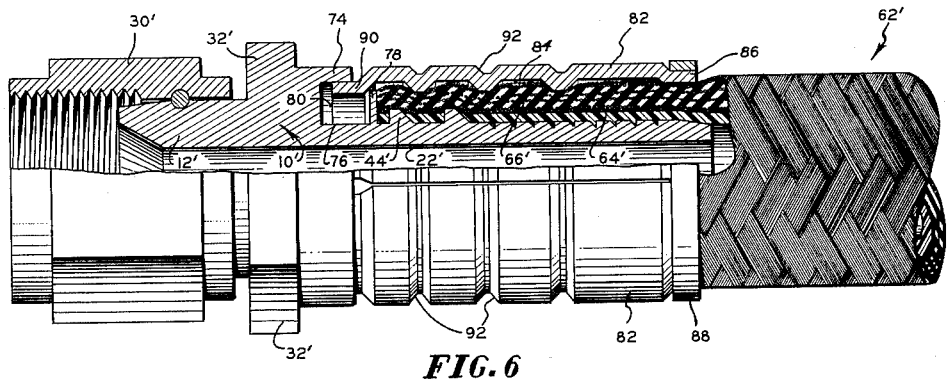
Figure 2:
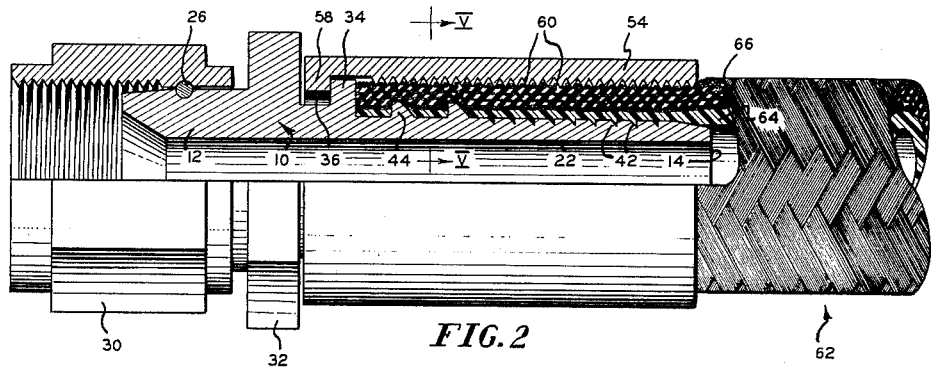
Figure 3:
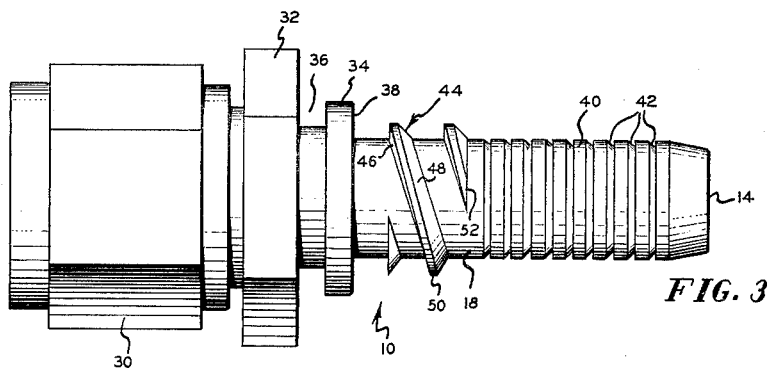
Figure 4:
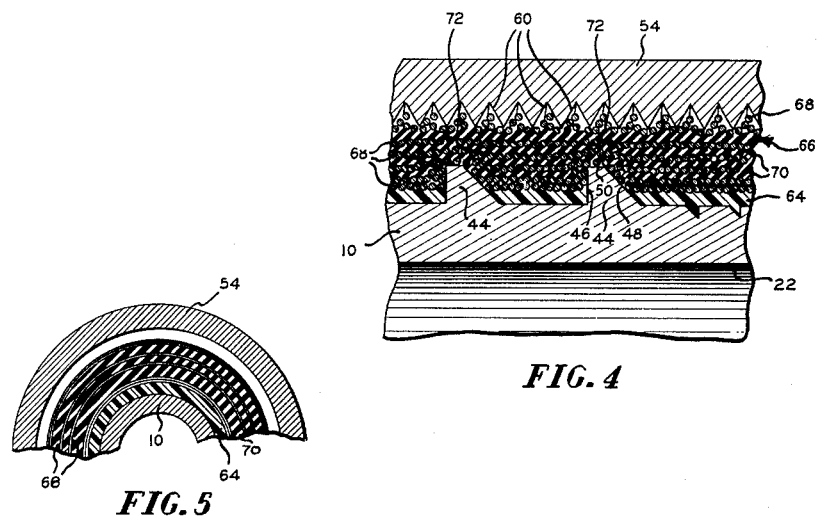
Figure 5:
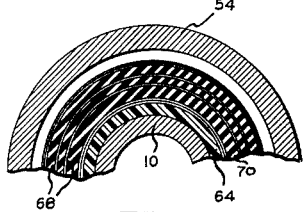

These and other objects of the invention arising from the details and relationships of the components of embodiments thereof will be apparent from the following description and accompanying drawings wherein:

FIG. 1 is an elevational, partly-sectioned view of a hose end fitting and high-pressure hose, in accord with the invention, in assembled relation prior to swaging of the socket upon the hose reinforcing covering, FIG. 2 is an elevational, partly-sectioned view of the assembled hose end fitting and hose upon the socket being swaged into engagement with the reinforcing covering, FIG. 3 is an elevational view of the end fitting nipple and associated nut structure, illustrating the spiral projection formed upon the nipple, FIG. 4 is an enlarged, detail, sectional, elevational view of the assembled end fitting relationship intermediate the nipple inner tube penetrating projections and the socket illustrating the compression of the reinforcing covering therebetween, FIG. 5 is an enlarged, detail, elevational, sectional view of the hose fitting assembly, as taken along section V—V of FIG. 2, and FIG. 6 is an elevational, partly-sectioned view of the invention as employed with a reusable hose end fitting having a segmental-type socket.

The concept of the invention may be employed with either permanently "swaged-on" fittings or with fittings of the reusable type. For the purpose of illustration, the principles and concepts of the invention described with respect to FIGS. 1 through 5 are those employed with a permanently mounted fitting wherein the socket member is permanently deformed or swaged into engagement with the hose reinforcing covering.

Referring to FIG. 1, a hose end fitting in accord with the invention includes a nipple member 10 of generally tubular configuration, having an outer end 12, an inner end 14, and a hose bore-receiving portion 16, having an outer surface 18 adapted to engage the inner surface of a hose inner tube. The outer end 12 is provided with a tapered recess 20 concentrically associated with the nipple bore 22. Recess 20 sealingly cooperates with a plumbing fitting, not shown, to which the end fitting is attached. For purposes of attaching the hose end fitting to other plumbing fixtures, an annular groove 24 is defined in the nipple outer end 12 for receiving an annular locking wire 26 which is also received within an annular recess 28 defined in a nut 30. The wire 26 thereby axially affixes the nut 30 with respect to the nipple 10, yet permits the nut to be rotated thereon. Internal threads are defined upon the nut for attachment to the plumbing fixture, not shown.

An enlarged, annular projection 32 is defined upon the outer end of the nipple having hexagonally-related flats defined thereon for receiving a wrench. Also, an annular, radially extending shoulder 34 is defined upon the nipple axially, inwardly spaced from the projection 32 whereby a recess 36 is defined between the projection 32 and shoulder 34. The shoulder 34 also defines an inner radial abutment surface 38, which engages the end of the hose upon the nipple being fully inserted into the hose.

The hose inner tube engaging surface 18 of the nipple 10 includes a sealing region 40 adjacent the inner end 14 which intimately engages the inner surface of the hose inner tube, preventing the flow of the pressurized medium between the nipple and the inner surface of the inner tube. To improve the sealing characteristics of the nipple sealing region 40, annular recesses 42 may be defined therein.

A spirally disposed, annular projection 44 is defined upon the outer surface 18 of the nipple adjacent the nipple outer end 12 and the shoulder 34. As illustrated, this annualr projection 44 may have the cross-sectional form of a buttress thread wherein a surface 46, FIG. 4, is perpendicularly disposed to the outer surface of the nipple, the forward surface 48 of the projection is obliquely related to the nipple surface, and the maximum radial dimension of the projection is defined by a cylindrical surface 50 disposed parallel to the nipple surface 18. The innermost or forward end 52 of the spirally disposed projection 44, FIG. 3, tapers into the nipple surface 18 in a substantially tangential relationship whereby insertion of the nipple into the hose inner bore is facilitated. The radial distance of the projection 44 from the surface 18 to the surface 50 is greater than the wall thickness of the hose inner tube disposed upon the nipple and, as will be later described, this relationship is of significance.

The hose end fitting socket 54 is of an elongated, annular configuration, having a cylindrical outer surface and an inner surface 56. The outer end of the socket 54 is provided with an inwardly, radially extending flange 58 of an axial length less than the axial dimension of the recess 36, whereby the flange 58 may be received within the recess. The socket 54 is formed of a material which is capable of being deformed without fracturing and may be of mild steel, aluminum, brass, or similar material. In the illustrated embodiment, the inner socket surface 56 is provided with a plurality of annularly disposed serrations 60. However, such serrations are not necessary to the practice of the invention, but are helpful in increasing the frictional engagement between the socket and the hose reinforcing covering.

The high-pressure, flexible hose illustrated in the drawings is of a simplified, typical type. In the illustrated embodiments, the hose 62 includes a tubular inner tube 64 of a resilient material which is not permeable to the medium being transmitted by the hose. The inner tube 64 is of a resilient nature and may be of rubber, rubber-like substances, high density polymerized tetrafluorethylene, or similar material. Radial expansion or inflation of the inner tube, due to the force exerted thereon by the pressurized medium, is prevented by encasing the inner tube in a reinforcing covering 66. The radial thickness of the reinforcing covering will vary according to the pressures for which the hose is designed. In that the fitting is particularly advantageous when used with very high pressure hose, the construction of such a hose includes a reinforcing covering 66 composed of a plurality of layers of wire strands 68 wrapped about the inner tube 64. The layers of strands 68 may be spirally wound, and in a normal practice adjacent layers are wound in opposite directions. Also, it is common to employ a filler 70 between adjacent layers of the reinforcing wire strands, and such a filler may be of a synthetic plastic nature, as indicated in the drawings. As the wire strands 68 are very tightly wound upon each other, the reinforcing covering, in effect, consists of a rather dense thickness composed of many adjacently disposed wire strands. The outermost layer of wire strands is usually woven in a braided manner, having interwoven strands wound in both the right and left directions, as will be apparent from the drawings. It will be understood that the construction of high-pressure, flexible hose varies in accordance with manufacturers and particular applications, and that the illustrated relationship is for purposes of illustration only.

Assembly of the hose end fitting to the hose is as follows:

The initial operation consists of severing the hose 62 at the desired length whereby a squared end is provided. No skiving of the hose is necessary. After the hose has been cut to the desired length and the socket 54 has been slipped onto the hose, the nipple portion 16 is inserted into the bore of the inner tube. Insertion of the nipple into the inner tube bore is relatively easily accomplished until the end 52 of the projection 44 engages the end of the hose. Thereupon, the nipple is rotated, by means of a wrench applied to the flats of the projection 32, in a direction whereby the projection 44 will be "screwed into" the hose inner tube. Rotation, and further insertion of the nipple into the inner tube, continues until the hose end engages the shoulder surface 38, as shown in FIG. 1.

As mentioned above, the radial extension of the projection 44 from the nipple surface 18 is greater than the radial thickness of the hose inner tube 64 wall thickness and, thus, the surface 50 and outer regions of the projection will penetrate and extend through the hose inner tube into direct engagement with the inner layer of the reinforcing wire strands 68.

As prior to insertion of the nipple into the inner tube the socket 54 has been slipped over the hose, the socket may now be aligned with the nipple structure, as shown in FIG. 1. Placing of the assembly within a conventional swaging apparatus, permits the socket 54 to be radially compressed into engagement with the reinforcing covering 66, as shown in FIG. 2. Such swaging of the socket radially translates the flange 58 into the recess 36 and, thus, positively prevents axial displacement of the socket relative to the nipple.

The relationship of the fitting and hose components upon completion of the swaging is apparent from FIGS. 2 and 4. The inner surface 56 of the socket, and the serrations 60 formed thereon, will be in intimate engagement with the exterior layer of the reinforcing covering 66, and the swaging operation will impose high compressive forces upon the reinforcing covering and inner tube interposed between the nipple and socket. As will be apparent from FIGS. 2 and 4, the inner tube wall thickness will decrease under the compressive forces interposed thereon by the reinforcing cover and socket whereby a firm interengagement of the wire strands 68 of the reinforcing covering with the spiral, annular projection 44 will be produced. The fact that the projection surface 46 is perpendicularly disposed to the axis of the nipple provides a particularly effective resistance to axial movement of the nipple in the "blow-off" direction, as the strands 68 abutting surface 46 resist movement between the nipple and hose in this direction. Also, it is desirable that the axial dimension of the projection surface 50 be greater than the diameter of the wire strands, whereby the surface 50 provides an abutment which will produce an effective opposed surface to the compression exerted upon the reinforcing cover by the socket. This arrangement produces a high degree of compression of the reinforcing cover in the area 72, indicated in FIG. 4, intermediate the projection surfaces 50 and the socket 54. The tapered surfaces 48 also aid in producing a high compression between the projection and socket. Thus, in effect, a metal-to-metal contact is substantially produced between the nipple, reinforcing covering, and socket, in the region of the projection 44.

Therefore it will be appreciated that as the greatest compression of the reinforcing covering occurs in the region of the projection 44 that the superior fitting retention produced by the high compression of the reinforcing covering will not adversely affect the sealing connection between the nipple and the inner tube occurring at nipple region 40.

The embodiment of FIG. 6 discloses the inventive concept as employed with a hose end fitting of the reusable type, having a segmental socket in place of the swaged socket. In describing the embodiment of FIG. 6, primed reference numerals are employed to indicate components identical to the previously described embodiment.

In the embodiment of FIG. 6, the nipple 10' and nut 30' are substantially of the same construction as that shown in FIGS. 1 and 2. The nipple construction differs in that the projection 32' is provided with a cylindrical, axially-extending lip 74 of annular configuration, which is radially spaced from the surface 76 of the nipple. A radially-extending projection 78 is defined upon the nipple 10' axially spaced from the projection 32' defining a recess 80 which receives an end of the socket segments, as will be later apparent.

The socket of this reusable fitting embodiment may consist of a pair of identical semicylindrical segments 82. Each segment is provided with an inner surface 84 and at the right end, FIG. 6, a ledge 86 is defined for receiving a retaining ring 88. The left end of the socket segments is disposed radially inwardly to define a tongue 90 which is receivable under the lip 74. It will be noted that the radial dimension of the projection 78 is such as to permit socket tongue access to recess 80 when the segment is not coaxial with the nipple, but will interfere with the tongue to prevent withdrawal of the socket tongue from the recess 80 upon the segments being coaxially retained relative to the nipple by ring 88. As the ring 88 encompasses the ledges 86 of both segments, the ring will maintain the assembled relationship, as shown in FIG. 6. The segmental socket arrangement described in this embodiment, and the nipple structure associated therewith, are disclosed in United States application No. 767,017, filed October, 13, 1958, now Patent No. 3,073,628.

Assembly of the nipple 10' into the inner tube 64' is identical to that of the embodiment of FIGS. 1 and 2, as rotation of the nipple will permit the projection 44' to thread into the inner tube until the end of the hose engages the projection 78. Thereupon, the tongue 90 of the segments 82 are inserted under the lip 74, and by employing compression means such as a vise, pliers, or similar tool, the segments are pivoted about their tongues to the concentric relationship with the reinforcing covering 66', as shown in FIG. 6. Thereupon, the ring 88, which has been previously slipped over the hose, is positioned on the ledges 86 to maintain the socket segments in the closed relationship. The socket segments may be indented as at 92 to provide internal serrations on the undersurface 84 of the socket to increase the frictional engagement of the socket with the reinforcing covering. As the radial compressive forces produced by this type of reusable fitting are usually less than those which may be produced by the swaged socket construction, the embodiment of FIG. 6 would not normally be employed with hoses transmitting as high a pressure as those employing the swaged socket fitting.

From the above description it will be apparent that the use of the projection 44 upon the nipple 10 provides a greater upsetting and gripping of the hose reinforcing cover than can be achieved by merely employing serrations on the undersurface of the socket and, thus, provides superior retention of the fitting upon the hose. In the practice of the invention it is not necessary to employ serrations upon the socket, as the compressive forces imposed on the reinforcing hose covering produced by the socket and the projetcion 44, provide the major part of the fitting retention. The invention provides a positive gripping of the hose reinforcing between the socket and the nipple without excessively compressing the inner tube upon the nipple at the sealing region. Thus, a high resistance to fitting "blow-off" can be produced in a fitting without adversely affecting its sealing characteristics.

It is appreciated that other embodiments to the invention than those disclosed may be apparent to those skilled in the art, without departing from the spirit and scope thereof, and it is intended that the invention be defined only by the scope of the appended claim.

What is claimed is:

In combination with a flexible hose having a tubular inner tube encased within a wire strand reinforcing covering, a hose end fitting including a tubular nipple having an outer surface and an inner end received within said inner tube and an outer end, fitting attachment means mounted on said nipple outer end, an annular socket disposed about said hose in axial alignment with said nipple outer surface and affixed relative to said nipple and having an inner surface engaging and confining said reinforcing covering, a spirally disposed annular projection defined upon said nipple radially extending from said nipple outer surface a distance significantly greater than the wall thickness of the inner tube mounted upon said nipple whereby said projection penetrates said inner tube and engages said reinforcing covering, said projection including a rear surface facing said fitting attachment means, a front surface disposed toward said inner end and a cylindrical terminating surface between said front and rear surfaces having an axial dimension greater than the diameter of the wire strands constituting said reinforcing covering, said rear surface being substantially perpendicular to the axis of said nipple, said front surface being obliquely disposed to the axis of said nipple extending from said terminating surface toward said inner end to said nipple outer surface, said projection being axially spaced from said nipple inner end whereby an inner tube sealing surface is defined on said nipple intermediate said projetcion and nipple inner end, said projection terminating surface being in opposed relation to said socket inner surface whereby said terminating surface and the opposed socket inner surface produce axially spaced regions of highly compressed reinforcement strands between said terminating surface and socket, and regions of lesser compressed reinforcement strands between said highly compressed regions, said regions of highly compressed reinforcement being of an axial dimension substantially equal to the axial dimension of said terminating surface, said strands of said covering engaging said projection rear surface.

(References on following page)

References Cited by the Examiner

UNITED STATES PATENTS

| | | | |
|---|---|---|---|
| 2,341,003 | 2/1944 | Watson | 285—256 |
| 2,661,225 | 12/1953 | Lyon | 285—256 |
| 2,797,111 | 6/1957 | Beazley | 285—259 |
| 2,805,088 | 9/1957 | Cline | 285—239 |
| 2,816,781 | 12/1957 | Woodling | 285—259 |
| 2,965,395 | 12/1960 | Schmohl | 285—259 |
| 3,073,628 | 1/1963 | Cline | 285—259 |

FOREIGN PATENTS

| | | |
|---|---|---|
| 792,029 | 3/1958 | Great Britain. |
| 148,792 | 2/1955 | Sweden. |

CARL W. TOMLIN, *Primary Examiner.*